(No Model.) 5 Sheets—Sheet 2.

G. A. GOODSON.
TYPE CASTING AND SETTING MACHINE.

No. 605,955. Patented June 21, 1898.

Witnesses.
C. F. Kilgore
R. D. Merchant

Inventor
George A. Goodson
By his Attorney
Jas. F. Williamson

(No Model.) 5 Sheets—Sheet 4.

G. A. GOODSON.
TYPE CASTING AND SETTING MACHINE.

No. 605,955. Patented June 21, 1898.

Witnesses.
C. F. Kilgore
F. D. Merchant

Inventor
George A. Goodson
By his Attorney
Jas. F. Williamson

THE NORRIS PETERS CO., PHOTO-LITHO., WASHINGTON, D. C.

(No Model.)  5 Sheets—Sheet 5.

G. A. GOODSON.
TYPE CASTING AND SETTING MACHINE.

No. 605,955. Patented June 21, 1898.

Witnesses.
C. F. Kilgore
O. D. Merchant.

Inventor:
George A. Goodson
By his Attorney.
Jas. F. Williamson

United States Patent Office.

GEORGE ARTHUR GOODSON, OF MINNEAPOLIS, MINNESOTA, ASSIGNOR, BY MESNE ASSIGNMENTS, TO THE GOODSON TYPE CASTING AND SETTING MACHINE COMPANY, OF SAME PLACE.

TYPE CASTING AND SETTING MACHINE.

SPECIFICATION forming part of Letters Patent No. 605,955, dated June 21, 1898.

Application filed January 25, 1897. Serial No. 620,613. (No model.)

*To all whom it may concern:*

Be it known that I, GEORGE ARTHUR GOODSON, a citizen of the Dominion of Canada, residing at Minneapolis, in the county of Hennepin and State of Minnesota, have invented certain new and useful Improvements in Type Casting and Setting Machines; and I do hereby declare the following to be a full, clear, and exact description of the invention, such as will enable others skilled in the art to which it appertains to make and use the same.

My invention relates to type casting and setting machines.

Although of general application wherever the corresponding functions are required, the invention is especially designed for use in what is known as "the Goodson type casting and setting machine," disclosed in my United States Patent No. 530,481, of date December 4, 1894.

The object had in view is to provide an improved mold and type-delivery device for use in the said machine, with a view of increased efficiency.

To these ends my invention consists of the novel devices and combinations of devices, which will be hereinafter described, and defined in the claims.

The invention is illustrated in the accompanying drawings, wherein like notations refer to like parts throughout the several views.

$a\ a'\ a^2$ represent sections or portions of a stepped bed on which the operative parts of the machine are mounted.

$b$ is a constantly-running shaft driven from any suitable source. On this shaft $b$ are mounted a series of cams, (numbered 1, 2, 3, 4, and 5, respectively.) Of the said numbered cams the members 1, 2, and 3 correspond to the cams marked with the same numbers in my Patent No. 530,481. All three of said cams 1, 2, and 3 are made fast to the shaft $b$ and perform substantially the same functions as the corresponding cams in my said patent. The cams 4 and 5 are new ones, added for the purposes which will appear in the further description. The cam 4 is fast to the shaft $b$, but the cam 5 is loose thereon and only operates at the end of each line, at which time the cam 5 turns once while the shaft $b$ turns twice. The cam 5 is so driven through a differential gearing (not shown) which is controlled by a clutch, the two members of which are shown and marked $b'$ and $b^2$, respectively. The half-clutch $b'$ is made fast to the shaft $b$ and the half-clutch $b^2$ is loose on the shaft and mounted for sliding motion thereon under the control of a suitable shifting-lever. (Not shown.)

The several cams operate through connections which may be noted, so far as necessary, when describing the parts moved thereby. Considering, first, the improved mold, $c\ c'$ are the movable members thereof.

Figures 10, 11, 12, 13, 14, 15, 16:
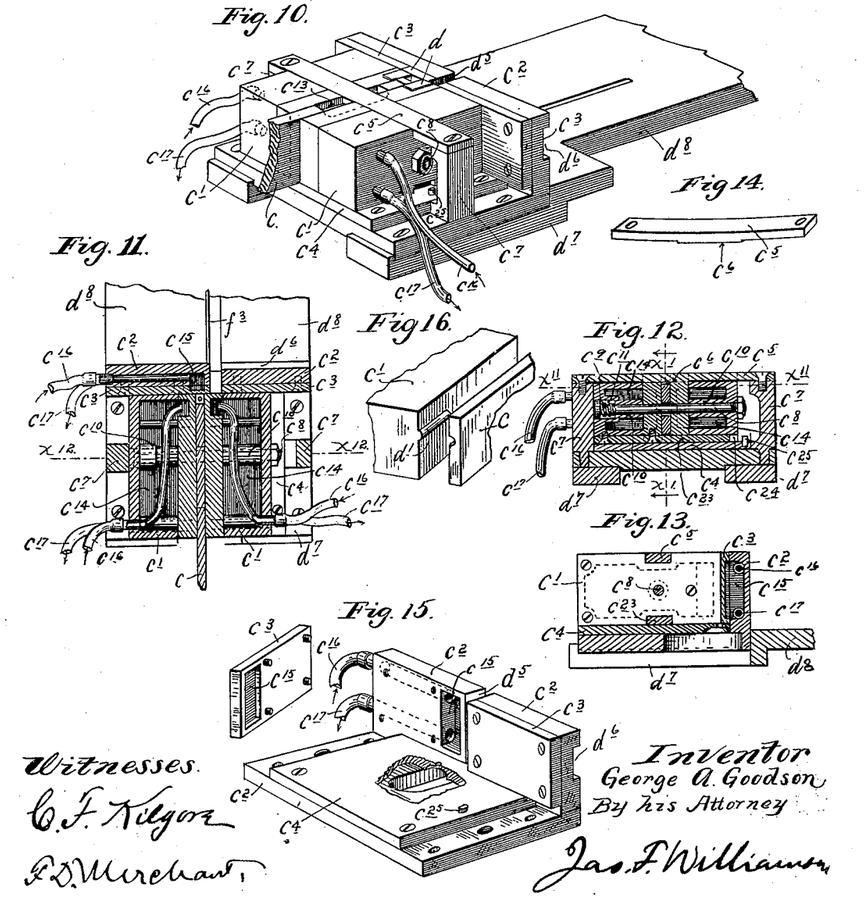
Fig. 10 is a perspective view of the type-body mold and a part of the bed for the same detached, with the parts of the mold in casting position.
Fig. 11 is a horizontal section through the mold substantially on the line $x^{11}\ x^{11}$ of Fig. 12.
Fig. 12 is a cross-section through the mold on the line $x^{12}\ x^{12}$ of Fig. 11.
Fig. 13 is a longitudinal section through the mold on the line $x^{13}\ x^{13}$ of Fig. 12.
Fig. 14 is a perspective view of the spring-binder or top bar which clamps the movable parts of the mold down to the fixed part of the mold detached.
Fig. 15 is a perspective view showing the fixed part of the mold with one of the hardened face-plates removed and with some portions broken away.
Fig. 16 is a detail showing certain parts of the mold in perspective.
Figures 17, 18:
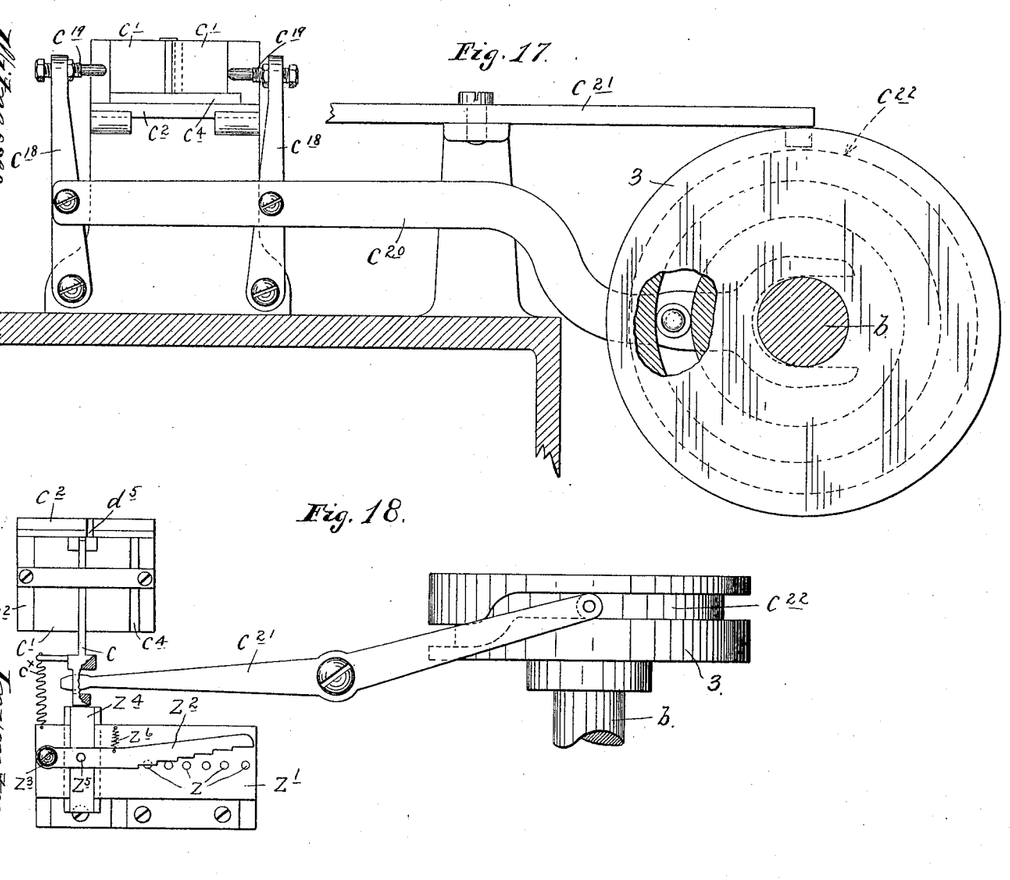
Fig. 17 is a detail view, partly in side elevation, some parts being broken away and partly in vertical section, taken from front to rear of the machine, showing certain connections for controlling the movements of the movable sections of the mold.
Fig. 18 is a plan view of the parts shown in Fig. 17, some parts being removed.

$c^2$ is the soft-metal portion of the fixed section of the mold, and $c^3\ c^4$ are the hardened face-plates of the same. These parts are assembled, as shown best in Figs. 1, 10, 11, and 12, with the movable members $c\ c'$ clamped down to the fixed member by a spring-bar $c^5$, having a boss $c^6$, which bears on the three movable parts, as shown best in Fig. 12. The spring-bar $c^5$ is made fast at its ends to posts $c^7$, rising from the soft-metal portion of the fixed mold-section. The body of the bar $c^5$ rests with a loose fit in a suitable seat countersunk in the backs or upper surfaces of the movable members $c'$. The plunger member $c$ is embraced by the members $c'$, and the said three parts are yieldingly clamped together by a headed draw-bolt $c^8$ and a spring $c^9$. The said draw-bolt $c^8$ works through thimble-like sections $c^{10}$ in the mold-blocks $c'$ and forming a part of the stock thereof, with the head of the bolt and the spring $c^9$ working in a countersunk recess $c^{11}$ at the outer end of one of said thimble-sections $c^{10}$. The draw-bolt $c^8$ works through a slot $c^{12}$ in the mold-plunger $c$, and the said plunger $c$ is also reduced, as shown at $c^{13}$, for affording clearance to permit the plunger to move under the clamping-bar $c^5$. The mold-sections $c'$ are recessed, as shown at $c^{14}$, to afford water-jacketing chambers. The part $c^2$ and one of the face-plates $c^3$ are also recessed to afford a similar water-chamber $c^{15}$. The chamber $c^{15}$ is only required in one pair of the coöperating parts $c^2$ and $c^3$. When the parts of the mold are in casting position, as shown in Figs. 10 and 11, the water-chambers $c^{14}$ and $c^{15}$ will be directly behind all the surfaces of the mold which coöperate with the plunger $c$ to form the mold-cell. Water is circulated through the jacketing-chambers $c^{14}$ and $c^{15}$ by means of circulating-pipes $c^{16}\ c^{17}$. Of these circulating-pipes the supply members $c^{16}$ are arranged to deliver the supply of cold water directly against the back surfaces of the walls which coöperate to form the mold-cell, while the waste or exhaust members $c^{17}$ are arranged to draw off the water from points in said chambers most remote from the backs of the parts forming the walls of the mold-cell. This detail in the arrangement of said circulating-pipes insures the best effect from the cooling-water.

It is of course necessary for the best results in the type that the surfaces which coöperate to form the mold-cell should be absolutely true or as nearly so as it is possible to make the same. It is also necessary that these cell-surfaces against which the cast is made should be case-hardened. In order to insure these results, I employ the following method in constructing the mold, to wit: I provide the soft-metal angle-block $c^2$, with its two parts formed as nearly as may be at right angles to each other. I then prepare the case-hardened plates $c^3$ with approximately true surfaces and secure the same to the angle-block in proper working position, with their lower edges at a sufficient height to permit the case-hardened bottom plate $c^4$ to be subsequently shoved thereunder. I then grind the plates $c^3$ and the horizontal member of the angle-block $c^2$. As the plates $c^3$ are above the horizontal part of the angle-block $c^2$, it is obvious that the grinding-tool will have room to work. The case-hardened bottom plate $c^4$ is then ground on both sides and applied in position, as shown in Fig. 15. By this means a perfect joint will be secured between the members $c^3$ and $c^4$, with their face surfaces true and set at exactly right angles to each other. The members $c$ and $c'$ are first ground on their surfaces which coöperate when the said three parts are clamped together. The three parts $c\ c'$ are then clamped together and ground on their bottom surfaces and on their end surfaces, which coöperate with the plates $c^3$ and $c^4$. The parts $c$ and $c'$ are then applied to the fixed section of the mold and clamped thereto by the spring-bar $c^5$. The whole mold is then ground on its top. In this way a mold is secured with perfectly true surfaces. It should have been noted that the plunger $c$ and the adjacent walls of the blocks $c'$, with which the plunger $c$ coöperates, are also case-hardened. In grinding the top of the mold slightly-raised surfaces $d$ are left on the tops of all the case-hardened plates which coöperate to form the top surface of the mold. By reference to my prior patent, No. 530,481, it will be seen that a two-way movable matrix-block, with the matrices thereof in rows in two directions, is employed for coöperation with the type-body mold. The purpose of the raised surfaces $d$, just herein noted, on the mold is to insure a tight joint with the centered matrix when the block is tightly clamped down thereto. Without the raised surfaces $d$ dust or dirt might prevent the matrix-block from making a tight joint between the matrix-wall and the top wall of the mold-cell.

The left-hand member of the movable block $c'$ is provided with a type-nick rib $d'$, which works in a corresponding groove in the plunger $c$. For producing in the type $d^3$ a nick $d^4$ on the side opposite to that in which the nick is usually placed the angle-block $c^2$ is provided with a vertical slot $d^5$, which constitutes the delivery-channel through which the type are ejected from the mold. The angle-block $c^2$ is also provided on its back with a countersunk seat $d^6$, for a purpose which will later appear.

The angle-block $c^2$ is made fast to a bed-plate $d^7$ $d^8$, part of which extends outward beyond the angle-block and constitutes a type-receiving ledge onto which the type are delivered after being ejected from the mold, as will presently be noted. The said bed-plate $d^7$ $d^8$ is stepped or shouldered to receive the angle-block $c^2$, as shown best in Figs. 9 and 10, and when the bottom plate $c^4$ is applied to the angle-block it makes a step between the bottom of the mold-cell and the outwardly-extended part $d^8$ of the bed. Otherwise stated, the part $d^8$ may be termed the "type-receiving ledge," and is located with its face at a lower level than the bottom of the mold-cell for permitting the type to be lowered below the top surface of the mold after the type are ejected and thereby affording clearance for the movement of the matrix-block into proper working position in respect to the mold. The means for pulling down or seating the ejected type onto the ledge $d^8$ will be described after noting certain other features of the mold.

Figure 1:
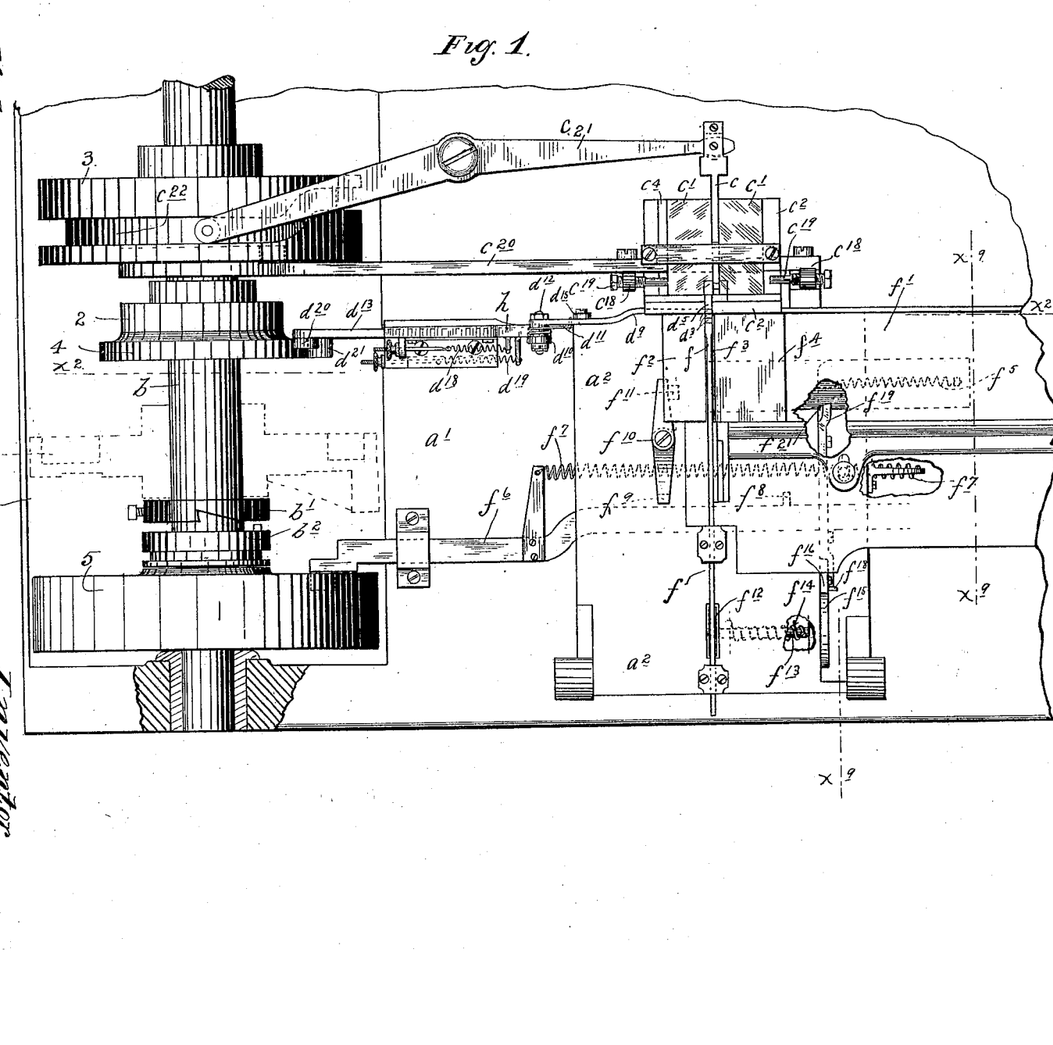
Figure 1 is a plan view of a part of the Goodson type casting and setting machine equipped with my improvements, with many portions removed and some parts shown in diagram only.

When the parts of the mold are in working position, as shown in Fig. 1, the movable members are subject to a pair of pivoted levers $c^{18}$, having adjustable pins $c^{19}$, adapted to engage alternately against the outer surfaces of the mold-blocks $c'$ for shifting the same from casting to ejecting position and reversely. The said levers $c^{18}$ are shifted by a cam-rod $c^{20}$, which is forked at its rear end to embrace the shaft $b$ and is provided with a roller working in a cam-channel on the profile face of cam-wheel 3. The plunger $c$ embraces the outer end of a pivoted cam-lever $c^{21}$, the rear end of which is provided with a roller engaging a peripheral channel $c^{22}$ in cam-wheel 3. Under the action of the lever $c^{21}$ the plunger $c$ receives a positive in-and-out motion with a throw of sufficient length for ejecting the cast type and for then retreating sufficiently far to clear the fixed section of the mold. The plunger $c$ simply embraces the end of the lever $c^{21}$ without being pinned thereto and sufficient clearance is afforded for the plunger $c$ to be moved by a spring $c^\times$ crosswise of said lever for assuming the proper position to determine the running width of the type-face. To thus properly position the mold-plunger $c$ for the proper type, the same is variably intercepted under its outward spring movement by a series of electrically-controlled stops $z$, which are arranged and actuated in the same way as in my prior patent.

The stops $z$ are mounted in a block $z'$ and coöperate with a serrated or stepped stop-lever $z^2$, one end of which is pivoted to said block $z'$, as shown at $z^3$. At its intermediate portion the stop-lever $z^2$ is connected to a stop-slide $z^4$, which is mounted for endwise movement in the block $z'$ and is so positioned that its forwardly-projecting end will intercept the rearward or outward movement of the mold-plunger $c$. As shown, a pin $z^5$ connects said lever $z^2$ to said slide $z^4$, and a spring $z^6$, applied to said lever $z^2$ and to said block $z'$, holds said slide against the projecting end of said mold-plunger. It is obvious that by throwing up different members of the stops $z$ the stop-lever $z^2$ and slide $z^4$, and hence also the mold-plunger $c$, may be variably intercepted, so as to give a type of the desired face or width. The mechanism for controlling or setting the stops $z$ forms no part of my present invention and hence is not shown.

Under the shifting movement of the mold members $c$ $c'$ by the cam-rod $c^{20}$ the said parts are clamped together and against the right-hand member of the post $c^7$ when in casting position, as shown in Fig. 1. When in this casting position, it is necessary that the said parts $c$ $c'$ should be positively clamped together and against some suitable banking-stop or base of resistance in order to insure the necessary tight joint; but when the mold is moving from casting to ejecting position and reversely it is desirable that the said parts $c$ $c'$ should be only yieldingly held, in order to afford sufficient freedom of movement to the plunger $c$ relative to the blocks $c'$. In order to insure this result when the movable parts $c$ $c'$ of the mold are in their ejecting position, I secure to the bottom of the right-hand block $c'$ a stop-bar $c^{23}$, which works in a countersunk seat $c^{24}$ in the bottom of the left-hand member of the blocks $c'$. Under the movement of the blocks $c'$ into ejecting position the stop-bar $c^{23}$ will engage with a stop-lug or pin $c^{25}$, fixed to the angle-block $c^2$, as shown in Fig. 12, while the left-hand block $c'$ is free to move over the top of said stop-lug $c^{25}$. Hence the clamping action from the outer member of the pivoted arm $c^{18}$ and cam-rod $c^{20}$ is taken on the right-hand member of the blocks $c'$, through the stop-bar $c^{23}$, which works against the stop-lug $c^{25}$. Hence under the movement of the mold members $c$ $c'$ from casting to ejecting position and reversely the said parts $c$ $c'$ are yieldingly held, only in respect to each other, by the draw-bolt $c^8$ and the spring $c^9$. Freedom is therefore afforded for the movement of the plunger $c$ in its ejecting and retreating actions. This is an important detail of improvement over the construction disclosed in my prior patent.

Figures 2, 3, 4, 5:
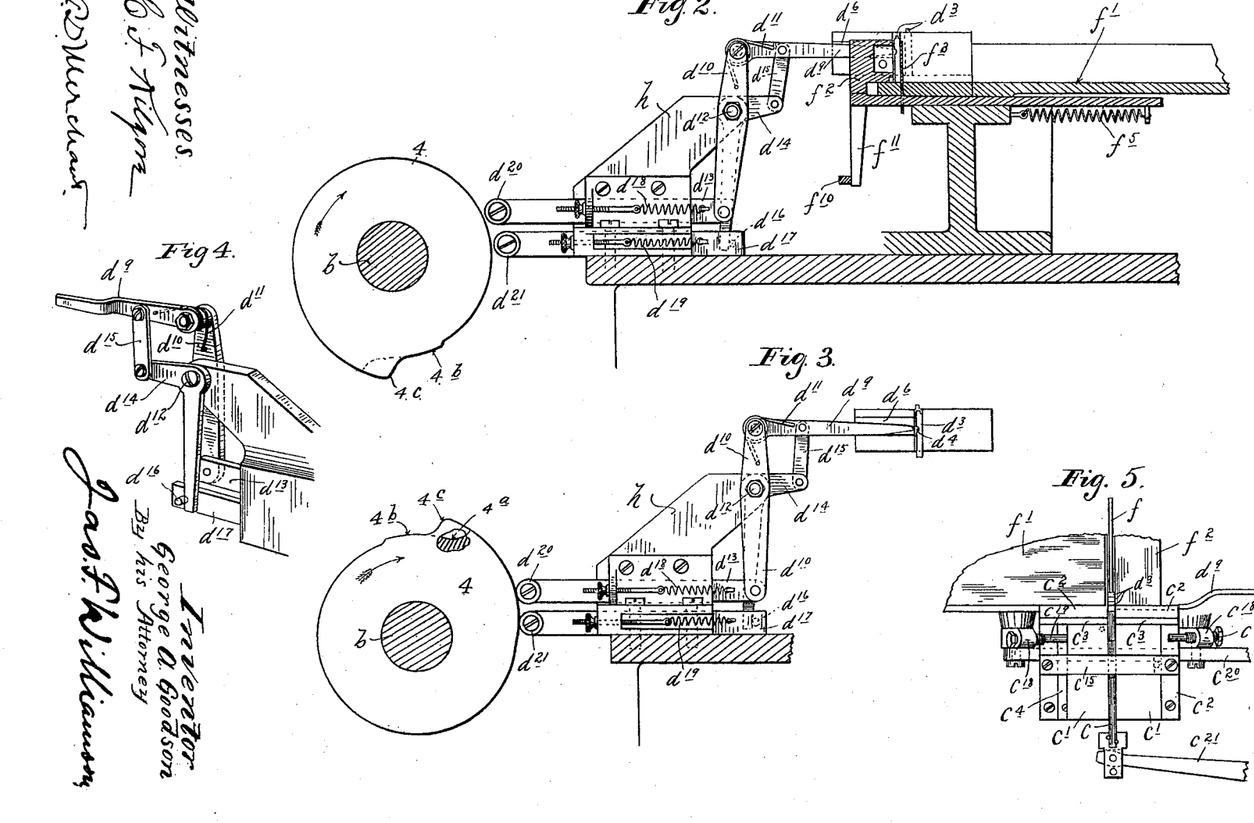
Fig. 2 is a vertical section approximately on the line $x^2\ x^2$ of Fig. 1, with the type-seating device in what may be regarded as its normal position.
Fig. 3 is a detail of some of the parts shown in Fig. 2, partly in elevation and partly in section, on the same line, but with the type-seating device shown as retracted or at the end of the first step of its four motions.
Fig. 4 is a perspective view of some of the parts shown in Figs. 2 and 3, but looking from the opposite side.
Fig. 5 is a detail in plan view, looking at the mold and some of the adjacent parts from the opposite side of the machine in respect to Fig. 1.
Figure 6:
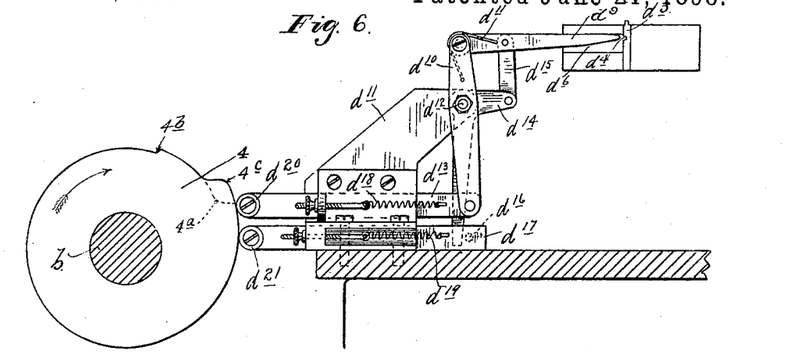
Figs. 6, 7, and 8 are views corresponding to Fig. 3 for illustrating the three additional steps or positions assumed by the type-seating device under its four motions.
Figure 7:
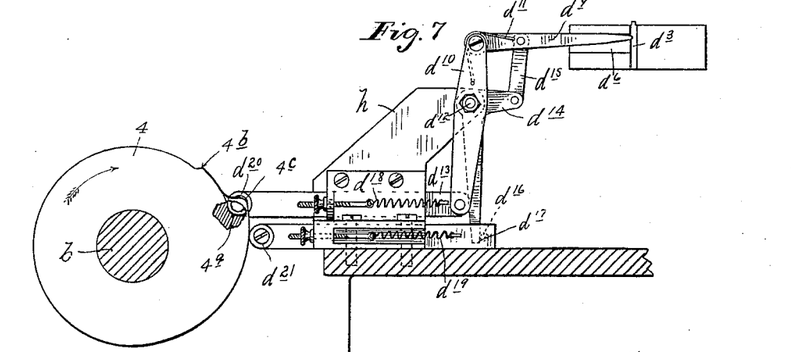
Figure 8:
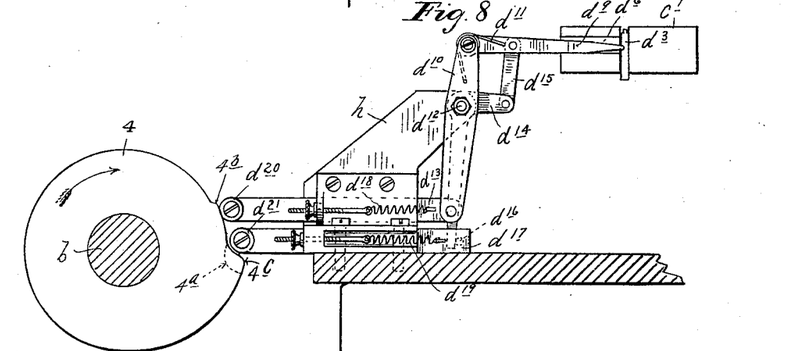

Returning now to the type-delivering devices, attention is specially called to Figs. 1 to 8, inclusive. While the type being ejected by the mold-plunger $c$ is still in the delivery-channel $d^5$ of the fixed mold-section, it is engaged by a lever-arm $d^9$, the free end of which is mounted in the countersunk seat $d^6$ for the same on the back of the angle-block $c^2$. This lever-arm $d^9$ has a rounded tip adapted to engage in the type-nick, and thereby become operative, first, to loosely clamp the type against the opposite wall of the delivery-channel $d^5$ in the angle-block $c^2$, and then subsequently to lower the type and seat the same on the receiving-ledge $d^8$. For this purpose the said lever-arm $d^9$ is subject to a four-motion action—to wit, up and down motions and in and out motions—within its guideway $d^6$. The said lever $d^9$ is pivotally connected to the upper end of a lever $d^{10}$ and is subject to a spring $d^{11}$, which tends to raise the arm $d^9$ to its limit in its guideway $d^6$. The lever $d^{10}$ is pivoted to a bearing-plate $h$ intermediate its extremities by a pin $d^{12}$. The lower end of the lever $d^{10}$ is pivotally connected to a slide $d^{13}$, which is subject to the action of cam-wheel 4. A bell-crank lever $d^{14}$ has its elbow pivoted to the fulcrum-pin $d^{12}$ of the lever $d^{10}$. The horizontal arm of the bell-crank $d^{14}$ is connected by link $d^{15}$ with the lever-arm $d^9$. The lower or vertical arm of the bell-crank $d^{14}$ is subject to the action of a pin $d^{16}$ on a slide $d^{17}$, which, like the slide $d^{13}$, is subject to the action of the cam-wheel 4. The slides $d^{13}$ and $d^{17}$ are held up against the cam-wheel 4 by adjustable springs $d^{18}$ and $d^{19}$, respectively. With this construction it will be seen that the cam-wheel 4 and the spring $d^{18}$, operating on the slide $d^{13}$, coöperate to rock the lever $d^{10}$ on the pin $d^{12}$, and thereby produce the in-and-out motion of the arm $d^9$ within its guide-seat $d^6$, while the action of the spring $d^{19}$ on the slide $d^{17}$ is to rock the bell-crank lever $d^{14}$ downward whenever so permitted by the cam-wheel 4. This downward-rocking motion of the bell-crank $d^{14}$ pulls the lever-arm $d^9$ downward against the tension of the spring $d^{11}$, and hence whenever the cam-wheel 4 forces the slide $d^{17}$ toward the right against the slide-spring $d^{19}$ the spring $d^{11}$ will throw the arm $d^9$ upward to its limit in its guideway $d^6$, thereby rocking the bell-crank $d^{14}$ upward and keeping the lower arm of the same in contact with the slide-pin $d^{16}$. The roller $d^{20}$ of the slide $d^{13}$ is narrower than the roller $d^{21}$ of the slide $d^{17}$, so as to stagger the said two rollers $d^{20}$ and $d^{21}$ in the horizontal plane for permitting the same to bear against different surfaces on the periphery of the cam-wheel 4. Otherwise stated, the roller $d^{21}$ has sufficient face to overreach the entire face of the cam-wheel 4, while the roller $d^{20}$ only extends over a part of the same. This permits two dropping-points $4^a$ and $4^b$ to be provided for the roller $d^{20}$, while only a single dropping-point $4^c$ is required for the roller $d^{21}$. The limit of up-and-down motion permitted to the lever $d^9$ in the recess $d^6$ prevents the cam-surface $4^b$ from affording any drop to the roller $d^{21}$. The downward movement of the lever $d^9$, and hence the inward movement of the slide $d^{17}$ toward the cam, is limited by the lower wall of the guideway or seat $d^6$ for the said lever $d^9$. With this disposition of the parts it is obvious that the necessary four motions on the lever-arm $d^9$ will be produced under the rotary motion of the cam-wheel 4. The results or effect thereof on the ejected type may be readily traced by inspection of Figs. 2, 3, 6, 7, and 8 of the drawings. If we regard Fig. 2 as showing the normal position of the lever $d^9$ or as the same would appear when holding the last previously-ejected type down on the ledge $d^8$, then Figs. 3, 6, 7, and 8 will illustrate the four steps of motion or four different positions taken by the said lever-arm $d^9$ under the actuating mechanism provided for the same, as hereinbefore described. The first step from normal is shown in Fig. 3, wherein the said lever $d^9$ has made its retreating step away from the last previously-ejected type under the action of the cam-wheel 4 and the slide $d^{13}$; but the spring $d^{19}$ is still operating to hold the said arm $d^9$ in its lowermost position. Otherwise stated, the lever $d^9$ has retreated on the same level as when in normal position. (Shown in Fig. 2.) In Fig. 6 the parts are shown as they would appear after the second step of motion or after the lever $d^9$ had been moved upward to its limit in its guideway $d^6$. This occurred as soon as the cam-wheel 4 moved the slide $d^{17}$ outward against its spring $d^{19}$ sufficiently far to permit the spring $d^{11}$ to become active. In Fig. 7 the parts are shown as they would appear after the third step of movement or as they would appear when the lever $d^9$ was just engaging the particular type $d^3$ then being ejected by the mold-plunger. This action occurs while the spring $d^{11}$ is holding the lever-arm $d^9$ in its uppermost position whenever the roller $d^{20}$ on the slide $d^{13}$ reaches the dropping-point $4^a$ on the cam-wheel 4. In Fig. 8 the parts are shown as they would appear after the fourth step of motion or as they would appear after the lever $d^9$ had been pulled down to its lowermost position, thereby carrying down with it the particular type engaged thereby and seating the same on the receiving-ledge $d^8$. This occurred the instant that the roller $d^{21}$ passed off from the high part of the cam $d^4$, thereby rendering the spring $d^{19}$ active to rock the bell-crank lever $d^{14}$ downward and through the link $d^{15}$ to pull the arm $d^9$ down therewith. Under the continued movement of the cam-wheel 4 the roller $d^{20}$ next passes off to the drop $4^b$, thereby permitting the spring $d^{18}$ to throw the arm $d^9$ forward to its limit and tightly clamp the ejected type in its ejected and seated position for holding the same, as shown in Fig. 2.

The type is ejected by the plunger $c$ against the spring-held abutment-rack $f$, and the mold-plunger $c$ does not begin to retreat until the parts have assumed the position shown in Fig. 8 or, more accurately stated, until the roller $d^{20}$ has reached the dropping-point $4^b$ on the cam-wheel 4. The point of the lever-arm $d^9$ only loosely engages the type when the parts are in the position shown in Fig. 7 in order to afford freedom for the downward movement of the type when the parts move from the position shown in Fig. 7 into the position shown in Fig. 8. After the type has reached the position shown in Fig. 8, however, the same may be tightly clamped by the lever-arm $d^9$ against the opposite wall of the delivery-channel $d^5$, and this is desirable in order to hold the type at the time when the mold-plunger begins to retreat.

With the type-seating device and its actuating mechanism, as above described, it is obvious that adequate provision is made for engaging the type as they are ejected from the mold and for seating the same at a lower level in an upright position on the receiving-ledge $d^8$. This type seating or pulling-down device is an important improvement over the construction shown in my prior patent. With the mold mounted as shown the type must be ejected at one level in line with the bottom of the mold-cell and be lowered to a different level in the fixed part of the mold or angle-block in order to give clearance for the proper movements of the matrix-block which coöperates with the mold, as hitherto noted. Hence this type-seating device just hereinbefore described is an important adjunct for insuring the proper delivery of the cast type from the mold into the line of assembly on the receiving-ledge $d^8$. The face of the receiving-ledge $d^8$ is on a common level with the face of the bed or bottom plate of the galley $f'$. In the movement of the type outward over the ledge $d^8$ the type are guided by the movable galley head or filler $f^2$ and a suitably-mounted disappearing rule $f^3$ at the sides of the line and are ejected against the head of the abutment-rack $f$, as hitherto noted. At the proper time the rule $f^3$ retreats downward out of the way by means not shown, and the galley-head $f^2$ is forced toward the right, thereby pushing the assembled line of type into the mouth of the galley against a movable piece of furniture $f^4$. Normally the galley-head $f^2$ is held at the extreme left-hand limit of its motion by a spring $f^5$. A slide $f^6$ is mounted on the bed-plate $a'$ of the machine and is subject to the cam-wheel 5 and a strong spring $f^7$. Normally the cam-wheel $f^5$ holds the slide $f^6$ at the extreme left against the tension of the spring $f^7$. At the end of the line the clutch mechanism $b'$ $b^2$ is tripped into action and the cam-wheel 5 is permitted to make a single turn, while the shaft $b$ makes two turns, as hitherto noted. Under the movement of the cam-wheel 5 the slide $f^6$ is pulled toward the left against the tension of the spring $f^7$, and in so doing operates the galley-head. For this purpose the slide $f^6$ is provided with a pin $f^8$, which engages the lower arm $f^9$ of a pivoted lever $f^{10}$. The other arm of the lever $f^{10}$ engages a depending arm $f^{11}$ on the galley-head $f^2$ and moves the same, under the action of the slide $f^6$, against the tension of the spring $f^5$. These connections may be readily understood from Figs. 1 and 9.

Figure 9:
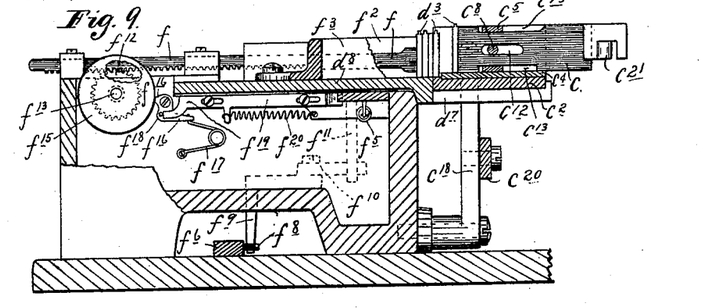
Fig. 9 is a cross-section substantially on the line $x^9\ x^9$ of Fig. 1, looking from the right.

It has already been stated that the type are ejected by the mold-plunger $c$ against the spring-held abutment-rack $f$. The said rack $f$, as shown in Figs. 1 and 9, engages with a pinion $f^{12}$, fixed to shaft $f^{13}$, and is subject to a torsion-spring $f^{14}$, wound about said shaft, which spring tends to turn the shaft and pinion from the left toward the right with respect to the position shown in Fig. 9. Otherwise stated, the spring $f^{14}$ tends to throw the abutment-rack $f$ inward to its limit; but the shaft $f^{13}$ is also provided with a friction-disk $f^{15}$, subject to a friction-pawl $f^{16}$. The pawl $f^{16}$ is normally held in engagement with the friction-disk $f^{15}$ by a spring $f^{17}$. Hence under the action of the friction devices $f^{15}$ and $f^{16}$ the abutment-rack $f$ will be held in whatever position it may be set by the mold-plunger $c$ acting against the ejected type in the ejecting action. These friction devices $f^{15}$ $f^{16}$ for holding the abutment-rack constitute an important improvement over my prior patent for the reason that slip and backlash, which would otherwise occur from a pawl and ratchet-wheel, is avoided. Hence there is no tendency from the abutment-rack $f$ to backlash and throw the type off their feet.

The pawl $f^{16}$ is provided with a lateral stud $f^{18}$. A releasing-slide $f^{19}$ is normally held by spring $f^{20}$ away from the stud $f^{18}$, with its inner end bearing against an inclined cam-surface $f^{21}$ on the slide of the galley-head $f^2$. Hence when the galley-head $f^2$ is moved outward to push the line of type into the galley the said cam-surface $f^{21}$ at the proper time operates on the releasing-slide $f^{19}$ with the effect of forcing the same against the stud $f^{18}$ and rocking the pawl $f^{16}$ away from the friction disk or wheel $f^{15}$. The said disk $f^{15}$ and the connected parts being thus released the spring $f^{14}$ becomes active to instantly throw the abutment-rack inward into its normal position ready for coöperation with the mold-plunger for the next line of type.

It will of course be understood that only so much of the complete type casting and setting machine has been illustrated in the drawings as was deemed desirable for the purpose of disclosing the improvements herein claimed. The parts omitted or imperfectly illustrated were not deemed necessary. Some of the parts shown performed various functions in addition to those herein specifically considered. The cam-wheel 5, for example, in addition to the function claimed coöperates in setting the justifier. The cam-wheel 2 operates the paper-strip-feed devices. The cam-wheel 1 (shown in dotted lines only) operates the matrix-block and the pump.

What I claim, and desire to secure by Letters Patent of the United States, is as follows:

1. In a type-casting machine, the combination with a type-body mold and a type-receiving ledge, with its face at a lower level than the bottom of the mold-cell, of a type-seating device, and means for operating the same with a four-motion action, to wit, first to retreat from the last seated type, second, to rise into an idle position, third, to move forward and engage the last cast type as ejected, and fourth, to move downward, thereby seating and holding the engaged type on said ledge until the next cast type is being ejected, substantially as and for the purposes set forth.

2. In a type casting and setting machine, the combination with the body-mold and a type-receiving ledge, with its face at a lower level than the bottom of the mold-cell, of a yielding abutment against which the cast type are ejected, and a type-seating device arranged to engage with the cast type as ejected, and seat and hold the same on their feet on said ledge, against said abutment, until the next cast type is being ejected, substantially as described.

3. In a type-casting machine, the combination with the body-mold and a type-receiving ledge, at a lower level than the mold, of a type-seating device operative to engage the cast type as ejected and seat the same on said ledge, comprising an arm carried by a pivoted lever, for the in-and-out motion, and subject to a second lever, for the up-and-down motion, a cam with a double face and a pair of spring-held slides operative on said levers and subject to said cam, substantially as described.

4. In a type-body mold, the combination with the movable members $c$ $c'$, of the fixed angle-block member $c^2$ having a delivery-channel $d^5$ extending outward beyond the side of the mold-cell, and a type-seating device mounted to move through one wall of said channel, at substantially right angles to the type, for engaging the type against the opposite wall of said channel as a base of resistance, substantially as and for the purposes set forth.

5. The combination with the movable mold members $c$ $c'$, of the fixed angle-block mold-section $c^2$ having the delivery-channel $d^5$ extending outward beyond the bottom face-plate of the mold, and provided on its back with the countersunk guideway $d^6$ intercepting one wall of said channel, the type-receiving ledge $d^8$ located with its face at a lower level than the bottom of the mold-cell, the type-seating lever-arm $d^9$ working in said guideway $d^6$, and means for imparting to said arm $d^9$ a four-step motion, substantially as and for the purposes set forth.

6. The combination with the fixed mold-section and a suitable base of resistance, of the movable mold-sections $c$ $c'$ yieldingly clamped together, with the plunger $c$ embraced by the blocks $c'$, and a stop-bar secured to one of said blocks $c'$, for coöperation with the base of resistance when the mold is clamped in its ejecting position, substantially as and for the purposes set forth.

7. The combination with the mold-plunger $c$ and the blocks $c'$ embracing the same, of the draw-bolt $c^8$ and spring $c^9$ yieldingly clamping the said parts together, the stop-bar $c^{23}$ fixed to one of said blocks $c'$ and working in a guideway $c^{24}$ of the other, and a stop $c^{25}$ in the path of said bar $c^{23}$, for coöperation in taking the clamping action from the mold-shifting device when the mold is in its ejecting position, substantially as and for the purposes set forth.

8. The combination with the fixed mold-section, of the movable mold-sections $c$ $c'$, movable on the said fixed section and the spring-top bar $c^5$ operating to yieldingly clamp the said movable sections to the said fixed section, substantially as described.

9. In a type casting and setting machine, the combination with the mold including a movable plunger, of an abutment-rack against which the type are ejected by the mold-plunger, a spring tending to throw said rack to its innermost position, and a friction device for holding the said rack, without backlash, in whatever position it may be set, under the type-ejecting action, substantially as described.

10. In a type casting and setting machine, the combination with the mold including a movable plunger, of the spring-held abutment-rack against which the type are ejected by the mold-plunger, a pinion-shaft having a friction-disk, and a spring-held friction-pawl engaging said disk, substantially as and for the purposes set forth.

11. In a type casting and setting machine, the combination with the mold, of a spring-held abutment-rack against which the type are ejected by the mold-plunger, a friction-disk and friction-pawl, coöperating to hold the said rack, without backlash, in whatever position it may be set, a movable galley-head with slide for forcing the assembled line into the galley, and a releasing device for said friction-pawl, operative by the galley-head slide for releasing the said abutment-rack, substantially as and for the purposes set forth.

In testimony whereof I affix my signature in presence of two witnesses.

GEORGE ARTHUR GOODSON.

Witnesses:
JAS. F. WILLIAMSON,
C. F. KILGORE.